United States Patent [19]

Demarest

[11] Patent Number: 4,666,489

[45] Date of Patent: May 19, 1987

[54] METHOD AND APPARATUS FOR FEEDING A ROTATING MELTER

[75] Inventor: Henry M. Demarest, Natrona Heights, Pa.

[73] Assignee: PPG Industries, Inc., Pittsburgh, Pa.

[21] Appl. No.: 805,677

[22] Filed: Dec. 6, 1985

[51] Int. Cl.[4] .............................................. C03B 50/14
[52] U.S. Cl. ......................................... 65/27; 65/134; 65/137; 65/335
[58] Field of Search .................... 65/27, 134, 137, 335

[56] References Cited

U.S. PATENT DOCUMENTS 4,047,920  9/1977  Armstrong ........................... 65/335
4,468,164  8/1984  Dunn et al. ........................ 65/335 X Primary Examiner—Robert Lindsay
Attorney, Agent, or Firm—Dennis G. Millman

[57] ABSTRACT

In a rotating vessel for liquefying pulverulent material wherein the pulverulent material forms a lining on sidewall portions of the vessel, pressing means are provided for creating a flattened end portion at the top of the lining onto which additional pulverulent material is fed and subsequently pressed into the lining. The pressing means is preferably a rotationally driven wheel and the pulverulent material may be glass batch. A more stable feeding operation and reduction of dusting are attained.

18 Claims, 3 Drawing Figures

METHOD AND APPARATUS FOR FEEDING A ROTATING MELTER

The present invention relates to improvements in feeding pulverulent material such as glass batch to a rotating melting process of the type disclosed in U.S. Pat. No. 4,381,934 of Kunkle et al. Although particularly suited for liquefying glass batch, such a process is generally applicable to processes that involve thermally converting a generally flowable, essentially solid state feed material to a molten or partly molten fluid. The Kunkle et al. patent teaches a method of converting batch materials to a partially melted, liquefied state on a support surface of the batch material itself. The initial process of liquefying batch material is isolated from the remainder of the melting process and is carried out in a manner uniquely suited to the needs of the particular step, thereby permitting the liquefaction step to be carried out with considerable economies of energy consumption and equipment size and cost. In addition, because thermal energy input is used to perform only the discrete liquefaction step, the relationship between this input and other operating parameters is more direct and generally less complex than in a conventional tank-type melting furnace.

The present invention relates to a preferred embodiment of Kunkle et al. wherein a drum portion of the melting chamber is mounted for rotation about a generally vertical axis, so that batch material fed into the chamber is held against the side walls thereby forming a lining within the drum. Heat is supplied, usually by combustion means, to the central cavity within the drum so that the batch lining encircles the heat source. The liquefaction process is carried out by feeding batch into the rotating drum through a stationary lid at a rate balanced with the rate at which surface portions of the batch layer become liquefied and flow downwardly through an outlet at the lower end of the drum. By thus permitting the liquefied material to flow freely from the drum and by balancing the rate of feeding with the rate of liquefying, a sufficient thickness of the batch can be retained on the sidewalls to protect the drum from undue thermal deterioration and to avoid contaminating contact between the throughput material and structural elements of the liquefaction apparatus.

In the Kunkle et al. patent, batch material is fed onto the upper portion of the batch lining and is permitted to tumble onto lower portions of the batch lining. The cascading of freshly fed batch material can sometimes be erratic or overly rapid, in which case it may be difficult to maintain the desired lining thickness in the upper region of the vessel. At times, when the lining is relatively thick, batch is scraped from the top of the batch lining by the stationary lid member and propelled into the central cavity where it may become entrained in gas streams. It would be preferred to minimize the free fall of the batch material through space within the liquefaction vessel so as to reduce entrainment of finely divided batch material. U.S. Pat. No. 4,529,428 of Groetzinger shows an improved feeding arrangement for such a rotating liquefaction vessel wherein the batch material is deflected at varying angles onto the face of the batch lining. That arrangement can reduce the amount of batch falling into the open space of the cavity within the vessel, but it would be preferred to further minimize the potential for batch material to become entrained by minimizing cascading actions. Furthermore, it would be desirable to provide a more positive control of the lining thickness and contour at the upper end and to render the liquefying action more uniform by minimizing erratic tumbling of batch.

SUMMARY OF THE INVENTION

In the present invention, batch materials are advanced toward the zone of active liquefaction in a rotary liquefying vessel by being pressed into the lining instead of falling onto the face of the lining. Pressing means are provided to subject the upper end of the batch lining to downward forces, which tend to create a flattened area at the end of the lining. Additional batch is then deposited onto this flattened area and is subsequently pressed down into the lining. As material is being added to the top of the lining, material on the face of the lining exposed to the heat within the central cavity is liquefied and flows down the sloped surface of the lining, thus resulting in continual renewal of the upper portion of the lining. In effect, the lining itself is advanced toward the zone of active liquefaction, thereby eliminating the dusting problem associated with dropping batch material into a heated zone.

The pressing means may be a static baffle member, but it is preferred to employ a rotating wheel arrangement. It has been found that the use of a rotating device minimizes friction between the pressing means and the batch lining, thereby lessening the tendency for batch to be forced over the edge of the lining into the cavity space. Most preferably, the pressing wheel is driven at a rotational speed to match the speed of the portion of the lining contacted by the wheel, thereby further minimizing friction therebetween. In some situations a frusto-conical wheel may be used to advantage.

The flattened area created by the pressing means need not be horizontal but, in fact, may slope somewhat downwardly toward the center of the vessel. This slope on the top edge of the lining is considerably less than the slope on the face of the lining where liquefaction is taking place. An advantage of such a sloped top surface is that the compaction of the lining by the pressing means has a component toward the outside of the vessel, thus further reducing any tendency to propel loose batch material over the edge of the lining. In another mode of operation, the pressing means may be employed to produce a depression or furrow at the top edge portion of the lining into which additional batch material may be fed. For such an operation, a pressing wheel may be angled so that an edge of the wheel is depressed into the top surface of the batch lining, or a specially contoured wheel may be employed for such a purpose.

These and other objects and advantages of the present invention will be made more apparent from the drawings and the detailed description of a preferred embodiment which follows.

THE DRAWINGS

DETAILED DESCRIPTION OF THE PREFERRED EMBODIMENT

The detailed description will be set forth in conjunction with a method and apparatus specifically adapted for liquefying glass batch, but it should be understood that the invention is applicable to the processing of other materials as well. The basic concept of liquefying materials in a vessel lined with a continuously replenished layer of essentially the pulverulent raw material is disclosed in U.S. Pat. No. 4,381,934 (Kunkle et al.) and reference may be had thereto for details of this process.

Figure 1:
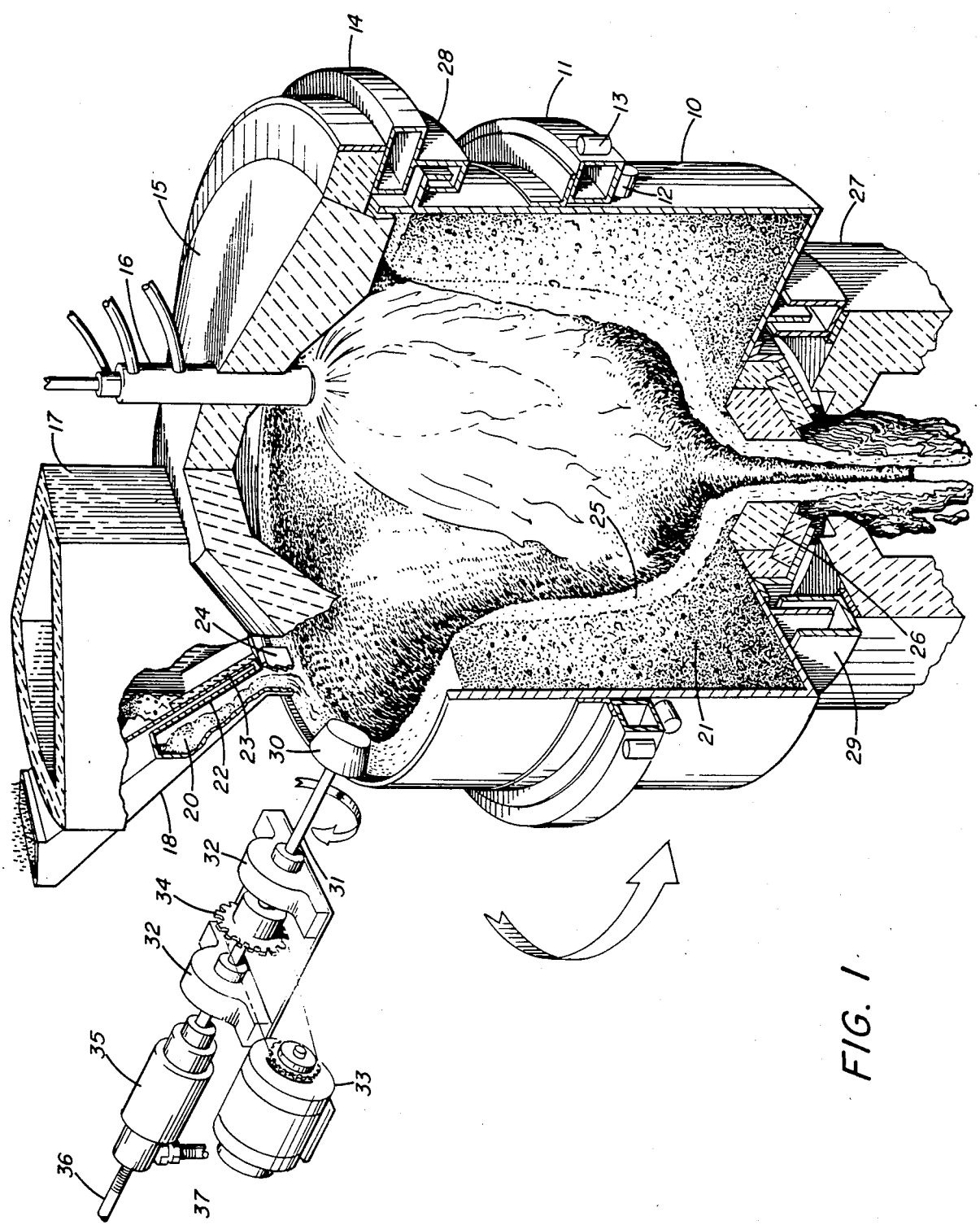
FIG. 1 is an isometric view of a rotary liquefying vessel, partly cut away to show the interior, including a preferred embodiment of pressing wheel in accordance with the present invention.

Referring to the specific embodiment shown in FIG. 1, the basic structure of the melting vessel is a drum 10 which may be fabricated of steel and which has a generally cylindrical sidewall portion, a generally open top and a bottom portion that is closed except for a drain outlet. The drum 10 is mounted for rotation about a substantially vertical axis, for example, by means of an encircling support ring 11, rotatably carried on a plurality of support wheels 12 and held in place by a plurality of aligning wheels 13 as shown schematically in FIG. 1. A substantially enclosed cavity is formed within the drum 10 by means of a lid structure 15 which is provided with stationary support by way of a peripheral frame 14, for example. The lid 15 may be constructed of refractory ceramic material and may take a variety forms as may be known to those of skill in the refractory furnace construction art. The preferred arrangement depicted in FIG. 1 is an upwardly domed, sprung arch construction fabricated from a plurality of refractory blocks. It should be understood that monolithic or flat suspended designs could be employed for the lid.

Heat for liquefying the batch material may be provided by one or more burners 16 extending through the lid 15. Preferably a plurality of burners are arranged around the perimeter of the lid so as to direct their flames toward a wide area of the material within the drum. The burners are preferably water cooled to protect them from the harsh environment within the vessel. Exhaust gases may escape from the interior of the vessel through an opening in the lid into a refractory duct 17.

Batch materials 20, preferably in a pulverulent state, may be fed into the cavity of the liquefying vessel by means of a chute 18 which, in the embodiment depicted, shares the opening in the lid 15 with the exhaust duct 17. The feed chute 18 may be protected from the hot gases by a flat water cooler 22 and a face plate of ceramic refractory 25. A deflector 24 may be provided at the end of the chute 18 for variably directing the batch stream to predetermined regions of the vessel interior in accordance with the teachings of U.S. Pat. No. 4,529,428 (Groetzinger). The batch chute 18 terminates closely adjacent to the sidewalls of the drum 10. A layer 21 of the batch material is retained on the interior walls of the drum 10, aided by the rotation of the drum, and serves as an insulating lining. As batch material on the surface of the lining 21 is exposed to the heat within the cavity, it forms a liquefied layer 25 that flows down the sloped lining to a central drain opening at the bottom of the vessel. The outlet may be fitted with a refractory ceramic bushing 26. A stream of liquefied material falls freely from the vessel into a stationary receptacle 27 and may thereafter be subjected to additional treatment to complete the melting process. The rate at which batch is fed to the vessel and the amount of heat supplied to the cavity are balanced against the rate of drainage of liquefied material from the vessel so as to maintain a minimum thickness of the lining 21 sufficient to protect the drum 10 from undue thermal deterioration.

An optional feature depicted in FIG. 1 is an atmosphere seal 28 at the interface between the upper rim of the rotating drum 10 and the stationary lid frame 14 comprised of a stationary, annular water-containing trough and a circular flange member extending downwardly into the trough from the rotating drum. The atmosphere seal 28 is shown removed from the left side of the vessel in FIG. 1 for the purpose of clarity. A similar seal 29 may be provided at the bottom of the vessel comprised of a stationary, annular water trough and a downwardly extending flange carried by the rotating drum.

The pressing means of the preferred embodiment depicted in FIG. 1 is comprised of a frusto-conical wheel 30 mounted at the end of a shaft 31 rotatably supported by bearings 32 and driven rotationally by any suitable, conventional means such as a motor 33 and sprocket 34. The pressing wheel 30 and shaft 31 may be fabricated of stainless steel and preserved against unduly rapid thermal deterioration by internal water cooling. Concentric flow patterns for the cooling water may be provided within the shaft 31, which may be provided at its outer end with a rotary union 35 coupling a source of cooling water 36 and a drain 37 to the interior of the shaft 31 and wheel 30. The shaft 31 may extend through an opening in the sidewall portion of the exhaust duct 17 or through any suitable opening in the lid 15 at other locations. It is preferred to locate the pressing wheel close to the point at which the batch is deposited onto the lining so that the newly fed batch can be compacted into the lining as soon as possible. Thus, while other locations are feasible, it is preferred to locate the pressing means within about 90° of rotation from the feed location. In at least some modes of operation, it is desirable that the dimension of the pressing wheel 30 has its axial dimension on the same order as the desired thickness of the upper edge portion of the lining 21. In this manner, all of the material deposited onto the upper surface of the lining can be compacted into the lining. However, during operation the lining thickness typically fluctuates, and benefits of pressing the batch into the lining can be obtained when the width of the wheel is greater or less than the width of the top of the lining. When the wheel is narrower than the top surface of the lining, the system can be operated to produce a furrow or trench in the top surface of the lining. This can be advantageous in some modes of operation whereby the batch is deposited into the furrow and thus is prevented from cascading over the edge of the lining. A similar furrowing effect can be achieved with a sharply angled pressing wheel or with a specially shaped pressing wheel.

Figure 2:
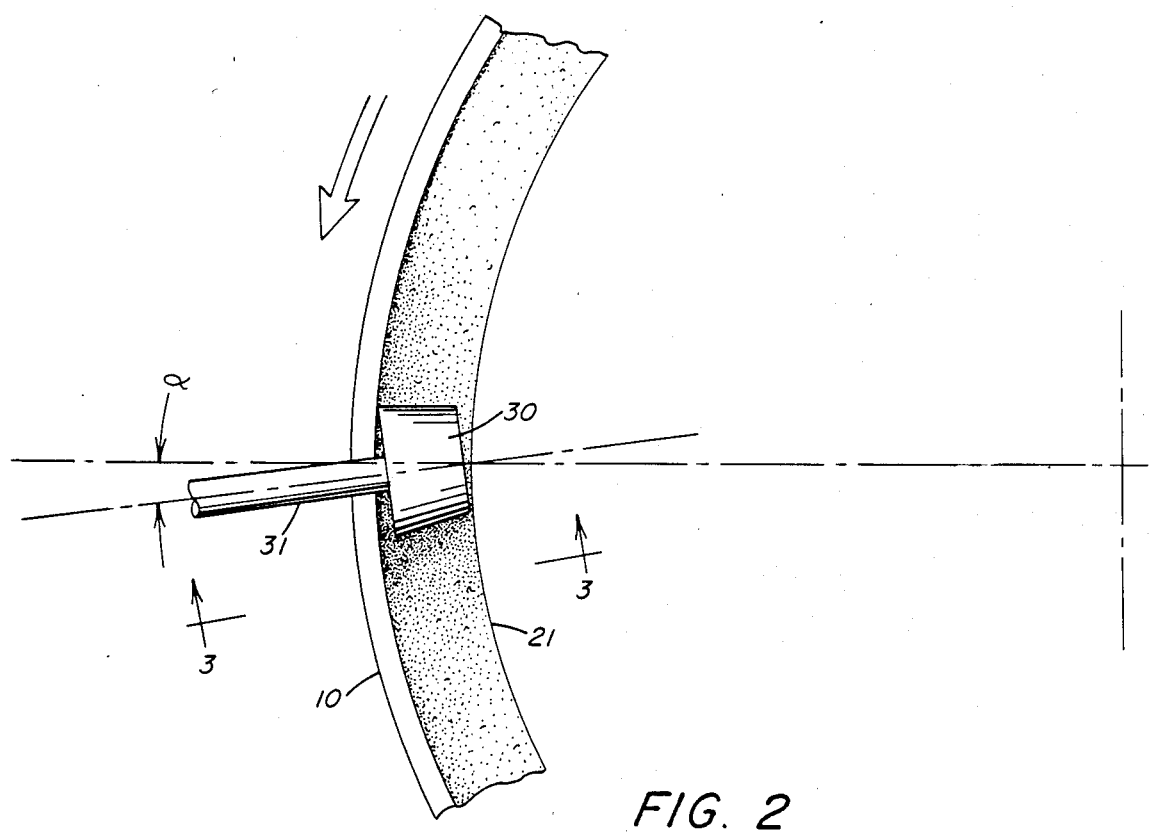
FIG. 2 is a schematic top view showing the orientation of a pressing wheel in a rotary vessel arrangement of the type shown in FIG. 1.

In the preferred embodiment, it has been found advantageous to provide certain orientations for the pressing wheel 30 and its shaft 31 relative to the drum 10. In this connection, the structure on which the shaft 31 is supported may be provided with angular adjustment, both vertically and horizontally. Referring now to FIG. 2, there is shown a top view of the pressing wheel 30 wherein the axis of the shaft 31 forms an angle $\alpha$ with a radius of the drum 10 passing through the center of the pressing wheel 30. This angle is such that the axis of the shaft 31, when extended toward the vertical axis of rotation of the drum 10, passes between the axis of the drum and the upstream side of the lining, that is, the side rotating toward the pressing wheel 30. Such an orientation locates the leading side of the pressing wheel 30 (i.e., the portion that first contacts the newly fed batch) closer to the inside surface of the drum than the trailing side of the pressing wheel. This is desirable in that it strips batch material from the upper rim portion of the drum and prevents accumulation of batch material between the pressing wheel and the drum.

Figure 3:
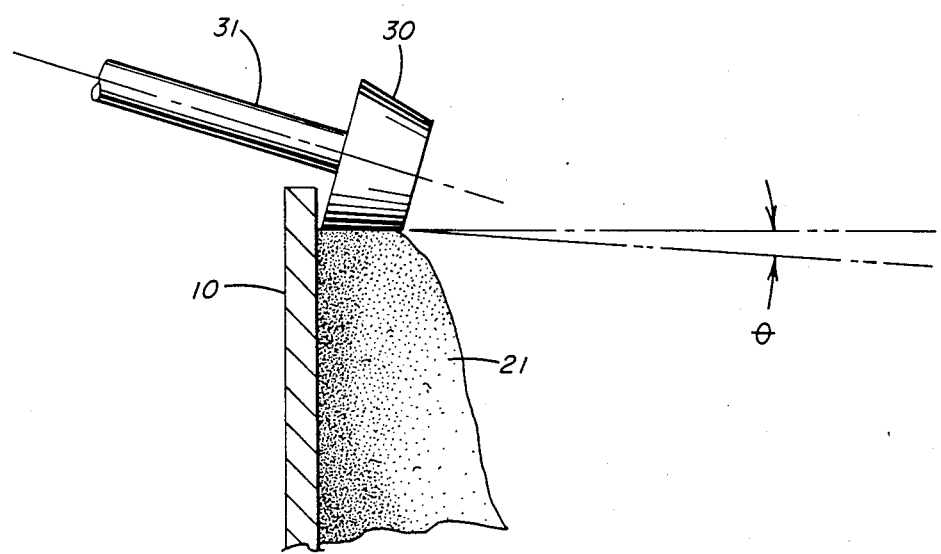
FIG. 3 is a schematic horizontal section of an upper edge portion of a rotating vessel and lining of the type shown in FIG. 1, taken along line 3—3 in FIG. 2, show-

Referring now to FIG. 3, there is shown a vertical section taken along line 3-3 in FIG. 2 showing the orientation of the pressing wheel 30 and shaft 31 in the vertical plane. The frustoconical shape of the pressing wheel 30 is employed to make contact between the wheel and the top of the batch layer nearly horizontal when the shaft 31 extends into the vessel at an angle as shown in FIG. 3. The inclination of the shaft 31 is for the convenience of accommodating the entry of the shaft through the existing lid structure. Alternatively, if interference with the surrounding structure can be avoided, the shaft 31 could be oriented horizontally and a cylindrical wheel with a larger diameter could be employed. In any case, the contact between the pressing wheel and the upper surface of the lining 21 is preferably sloped downwardly toward the center of the drum 10 at an angle $\theta$. The angle $\theta$ may be relatively small, for example, on the order of about 1° to 3°, its purpose being merely to provide a slight outward component of force to the material at the top of the lining 21 so as to avoid forcing material over the edge and onto the steeply sloped portion of the lining.

The precise mechanism by which batch particles pressed into the top surface of the lining become transported to the liquefying face of the lining is not fully known and may vary under different operating conditions. But it appears that the downward movement of batch in the lining caused by the pressing means is transmitted a substantial distance into the lining, thereby causing at least an upper portion of the lining to bulge toward the center of the vessel, forcing batch material toward the surface of the lining at which active liquefaction is taking place. Thus, the upper "shoulder" portion of the lining is not constant, but rather is continuously being renewed. The lining in the lower portions of the drum do not appear to participate in this dynamic renewal process.

As an alternative to the preferred rotating wheel embodiment, the invention contemplates the use of stationary baffle means to press batch into the lining. The baffle may be a refractory block supported in substantially the same location as the wheel, suspended from a water-cooled beam extending through the stationary lid structure. The underside of the block is preferably provided with a slight downward angle in the direction or rotation of the adjacent lining portion. The bottom surface of the block may also slope downwardly toward the center of the drum to avoid propelling batch into the cavity.

A plurality of the pressing means may be deployed in a vessel to increase control over the shape of the lining and/or to permit replacement of one pressing means without disrupting operation.

Other variations and modifications, as would be apparent to those of skill in the art, may be resorted to within the spirit and scope of the invention as defined by the claims which follow.

I claim:

1. In a method of liquefying pulverulent material wherein pulverulent material is fed into a vessel rotating about a generally vertical axis, a layer of pulverulent material is retained on the interior sidewalls of the vessel as a lining, pulverulent material is heated on the surface of the lining to liquefy the material, and liquefied material is drained from the vessel, the improvement comprising:
creating a material receiving area at the upper end of the lining by means of a pressing member exerting a downward component of force against the upper edge portion of the lining, and feeding the pulverulent material onto the material receiving portion.

2. The method of claim 1 wherein the pressing member makes rolling contact on the upper end of the lining.

3. The method of claim 2 wherein the pressing member is rotationally driven.

4. The method of claim 1 wherein the material receiving area is created with a slight slope downwardly toward the center of the vessel.

5. The method of claim 1 wherein the pulverulent material comprises glass batch material.

6. The method of claim 1 wherein pulverulent material fed onto the material receiving portion is pressed down into the lining thereby forcing pulverulent material in portions of the lining toward the liquefying surface of the lining.

7. The method of claim 1 wherein pulverulent material fed onto the material receiving portion is pressed by the pressing member within 90° of rotation of the vessel.

8. Apparatus for liquefying pulverulent material comprised of a vessel mounted for rotation about a generally vertical axis, means for feeding pulverulent material closely adjacent to interior sidewall portions of the vessel so as to establish a lining of pulverulent material thereon, heating means for liquefying the pulverulent material, and outlet means for draining liquefied material from a lower portion of the vessel, the improvement comprising: pressing means for exerting a downward force on upper end portions of the lining.

9. The apparatus of claim 8 wherein the pressing means includes a rotatably mounted pressing wheel supported adjacent to upper interior sidewall portions of the vessel.

10. The apparatus of claim 8 wherein the pressing means is oriented such that the surface bearing against the end portion of the lining is at a horizontal or nearly horizontal orientation.

11. The apparatus of claim 9 wherein the pressing wheel has a frusto-conical shape.

12. The apparatus of claim 9 wherein the pressing wheel is carried on a shaft extending out of the vessel in a direction having a major horizontal component.

13. The apparatus of claim 12 wherein the direction of the shaft has a minor vertical component.

14. The apparatus of claim 13 wherein the pressing wheel has a frusto-conical shape.

15. The apparatus of claim 12 wherein the shaft is oblique to radii of the vessel passing through the center of the wheel.

16. The apparatus of claim 8 wherein the pressing means is mounted within 90° of rotation of the vessel from the location of the feed means.

17. The method of claim 1 wherein the material receiving area is substantially flattened.

18. The method of claim 1 wherein the material receiving area includes a furrowed portion.

* * * * *